(12) United States Patent
Wu

(10) Patent No.: US 10,951,555 B2
(45) Date of Patent: Mar. 16, 2021

(54) PROVIDING LOCAL SERVICE INFORMATION IN AUTOMATED CHATTING

(71) Applicant: Microsoft Technology Licensing, LLC, Redmond, WA (US)

(72) Inventor: Xianchao Wu, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/605,713

(22) PCT Filed: May 8, 2017

(86) PCT No.: PCT/CN2017/083433
§ 371 (c)(1),
(2) Date: Oct. 16, 2019

(87) PCT Pub. No.: WO2018/205084
PCT Pub. Date: Nov. 15, 2018

(65) Prior Publication Data
US 2020/0137000 A1   Apr. 30, 2020

(51) Int. Cl.
*G06F 15/16* (2006.01)
*H04L 12/58* (2006.01)
*G06N 20/00* (2019.01)
*G06F 16/332* (2019.01)
*G06N 5/00* (2006.01)

(52) U.S. Cl.
CPC .......... *H04L 51/02* (2013.01); *G06F 16/3329* (2019.01); *G06N 5/003* (2013.01); *G06N 20/00* (2019.01); *H04L 51/046* (2013.01); *H04L 51/20* (2013.01)

(58) Field of Classification Search
CPC ....... H04L 51/02; H04L 51/046; H04L 51/20; H04L 12/58; G06N 20/00; G06N 5/003; G06F 16/3329
See application file for complete search history.

(56) References Cited

U.S. PATENT DOCUMENTS 7,328,209 B2   2/2008   Das et al.
7,433,876 B2   10/2008   Spivack et al.
(Continued)

FOREIGN PATENT DOCUMENTS

CN    101076184 A    11/2007
CN    101465819 A    6/2009
(Continued)

OTHER PUBLICATIONS

NPL Peiyun et al (CN101465819A) (Year: 2009).*
(Continued)

*Primary Examiner* — Razu A Miah
(74) *Attorney, Agent, or Firm* — Schwegman Lundberg & Woessner, P.A.

(57) ABSTRACT

The present disclosure provides method and apparatus for providing information in automated chatting. A message is received in a chat flow. At least one of location information, time information and service intention information is identified from the message. A response to the message is generated based on at least one of the location information, the time information and the service intention information. The response is provided in the chat flow.

15 Claims, 9 Drawing Sheets

(56) References Cited

U.S. PATENT DOCUMENTS

| | | | |
|---|---|---|---|
| 7,860,928 B1* | 12/2010 | Anderson | H04L 12/1813 709/204 |
| 8,117,178 B2 | 2/2012 | Qi et al. | |
| 8,352,388 B2 | 1/2013 | Estes | |
| 8,630,961 B2* | 1/2014 | Beilby | G06N 3/004 706/11 |
| 8,818,926 B2* | 8/2014 | Wallace | G06Q 30/02 706/47 |
| 9,489,657 B2* | 11/2016 | Chudge | H04L 67/22 |
| 2007/0124789 A1* | 5/2007 | Sachson | H04N 21/44008 725/117 |
| 2007/0198645 A1* | 8/2007 | Chen | H04L 12/1822 709/207 |
| 2011/0035453 A1* | 2/2011 | Koul | G06Q 10/107 709/206 |
| 2011/0153761 A1* | 6/2011 | Anderson | H04L 51/04 709/206 |
| 2011/0161164 A1* | 6/2011 | Anderson | G06Q 30/0255 705/14.45 |
| 2011/0161171 A1* | 6/2011 | Anderson | G06Q 30/0246 705/14.54 |
| 2011/0208822 A1* | 8/2011 | Rathod | G06F 16/9535 709/206 |
| 2011/0276396 A1* | 11/2011 | Rathod | H04L 51/066 705/14.49 |
| 2012/0290664 A1* | 11/2012 | Ahmed | H04L 51/24 709/206 |
| 2013/0013719 A1* | 1/2013 | Anderson | G06Q 30/02 709/206 |
| 2013/0254306 A1* | 9/2013 | Anderson | H04L 12/1813 709/206 |
| 2013/0254314 A1* | 9/2013 | Chow | G06F 16/957 709/206 |
| 2014/0100902 A1* | 4/2014 | Godfrey | G06Q 30/06 705/7.13 |
| 2014/0149121 A1 | 5/2014 | Di fabbrizio et al. | |
| 2014/0164257 A1* | 6/2014 | Brown | G06Q 30/016 705/304 |
| 2014/0307863 A1* | 10/2014 | Snyder | H04M 3/42068 379/265.09 |
| 2015/0095303 A1 | 4/2015 | Sonmez et al. | |
| 2015/0227589 A1 | 8/2015 | Chakrabarti et al. | |
| 2015/0332670 A1 | 11/2015 | Akbacak et al. | |
| 2016/0132608 A1* | 5/2016 | Rathod | H04W 4/21 707/722 |
| 2016/0155172 A1* | 6/2016 | Vernick | H04L 67/025 705/26.41 |
| 2016/0255139 A1* | 9/2016 | Rathod | H04L 51/046 709/203 |
| 2016/0350653 A1 | 12/2016 | Socher et al. | |

FOREIGN PATENT DOCUMENTS

| | | |
|---|---|---|
| CN | 102323933 A | 1/2012 |
| CN | 106357942 A | 1/2017 |
| WO | 0241169 A1 | 5/2002 |

OTHER PUBLICATIONS

NPL ip.com 1 NPL ip.com 2 (Year: 2020).*

NPL google patents (Year: 2020).*

Knight, Will, "Google to Developers: Here's How to Stop Making Dumb Chatbots", Retrieved From: https://www.technologyreview.com/s/601440/google-to-developers-heres-how-to-stop-making-dumb-chatbots/, May 12, 2016, 8 Pages.

Li, et al., "Semantic Matching in Search", In Journal of Foundations and Trends in Information Retrieval, vol. 7 Issue 5, Jun. 2014,130 Pages.

Lorica, Ben, "Using AI to Build a Comprehensive Database of Knowledge", Retrieved From: https://www.oreilly.com/radar/podcast/using-ai-to-build-a-comprehensive-database-of-knowledge/, Jun. 2, 2016, 7 Pages.

"International Search Report and Written Opinion Issued in PCT Application No. PCT/CN17/083433", dated Jan. 29, 2018,11 Pages.

Pilato, et al., "Expert Chat-Bots for Cultural Heritage", In Journal of Intelligenza Artificiale, vol. 2,No. 2, Jun. 2005, 12 Pages.

"Machine Translation of CN 101465819A, published Jun. 24, 2009", 19 Pages.

"Extended European Search Report issued in European Patent Application No. 17908910.7", dated Nov. 20, 2020, 10 Pages.

Yan, et al., "Learning to Respond with Deep Neural Networks for Retrieval-Based Human-Computer Conversation System", In Proceedings of the 39th international ACM SIGIR Conference on Research and Development in Information Retrieval, Jul. 17, 2016, pp. 55-64.

Yu, et al., "Sequential Matching Network: A New Architecture for Multi-turn Response Selection in Retrieval-based Chatbots", In the Repository of arXiv:1612.01627v1, Dec. 6, 2016, 10 Pages.

* cited by examiner

US 10,951,555 B2

PROVIDING LOCAL SERVICE INFORMATION IN AUTOMATED CHATTING

CROSS-REFERENCE TO RELATED APPLICATION

This application is a U.S. National Stage Filing under 35 U.S.C. 371 of International Patent Application Serial No. PCT/CN2017/083433, filed May 8, 2017, and published as WO 2018/205084 A1 on Nov. 15, 2018, which application is incorporated herein by reference its entirety.

BACKGROUND

Artificial Intelligence (AI) chatbot is becoming more and more popular, and is being applied in an increasing number of scenarios. The chatbot is designed to simulate people's conversation, and may chat with users by text, speech, image, etc.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose a method for providing information in automated chatting. A message is received in a chat flow. At least one of location information, time information and service intention information are identified from the message. A response to the message is generated based on at least one of the location information, the time information and the service intention information. The response is presented in the chat flow.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Figure 1:
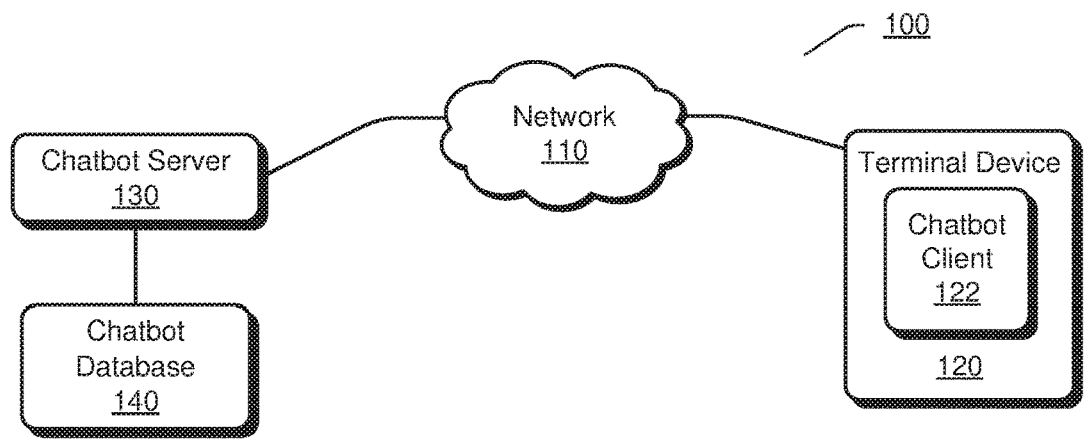
FIG. 1 illustrates an exemplary application scenario of a chatbot according to an embodiment.

FIG. 1 illustrates an exemplary application scenario 100 of a chatbot according to an embodiment.

In FIG. 1, a network 110 is applied for interconnecting among a terminal device 120 and a chatbot server 130. The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be a desktop computer, a laptop, a tablet, a smart phone, etc. Although only one terminal device 120 is shown in FIG. 1, it should be appreciated that a different number of terminal devices may connect to the network 110.

The terminal device 120 may include a chatbot client 122 which may provide automated chatting service for a user. In some implementations, the chatbot client 122 may interact with the chatbot server 130. For example, the chatbot client 122 may transmit messages inputted by the user to the chatbot server 130, and receive responses associated with the messages from the chatbot server 130. However, it should be appreciated that, in other implementations, instead of interacting with the chatbot server 130, the chatbot client 122 may also locally generate responses to messages inputted by the user.

The chatbot server 130 may connect to or incorporate a chatbot database 140. The chatbot database 140 may comprise information that can be used by the chatbot server 130 for generating responses.

It should be appreciated that all the network entities shown in FIG. 1 are exemplary, and depending on specific application requirements, any other network entities may be involved in the application scenario 100.

Figure 2:
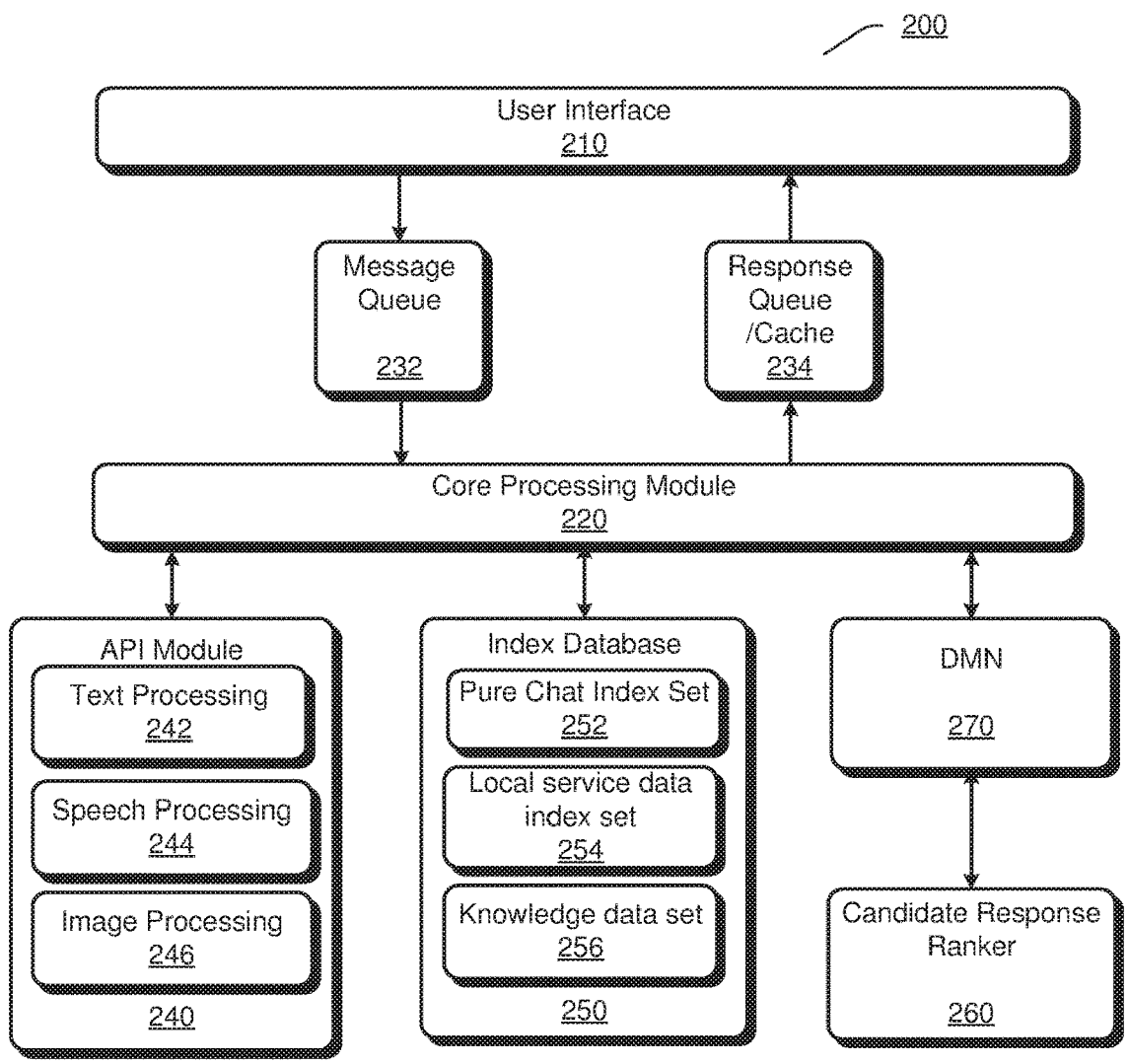
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The core processing module 220 may obtain messages inputted by the user in the chat window, and store the messages in the message queue 32. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text sentences, the text processing unit 242 may perform text understanding on the obtained text sentences, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through an index database 250. The index database 250 may comprise a plurality of index items that can be retrieved by the core processing module 220 as responses. The index items in the index database 250 may include a pure chat index set 252, a local service data index set 254 and a knowledge data set 254. The pure chat index set 252 may comprise index items that are prepared for free chatting between users and the chatbot, and may be established with data from social networks. The index items in the pure chat index set 252 may or may not be in a forma of question-answer pair. The question-answer pair may also be referred to as message-response pair or query-response pair. The local service data index set 254 may include data related to various services or service entities such as restaurants, hotels, shops, gymnasiums, gardens, scenery spots and so on, the local service data may be obtained from various feeds such as feeds from third party, searching system and so on. The knowledge data set 256 may comprise knowledge data generated based on knowledge information from knowledge-style websites on the network. For example, local service knowledge data may be generated from the websites related to the local service. Taking restaurants as an example, the knowledge data may be obtained from various websites such as Yelp.com, Dianping.com or the like. The knowledge data in the knowledge database may also be referred to as knowledge graph.

The core processing module 220 may utilize a candidate response ranker 260 and a Dynamic Memory Network (DMN) model 270 for generating responses. The candidate response ranker 260 may identify a plurality of candidate responses to a message based on ranking scores. The DMN model 270 may generate a response to the message based at least on the ranked candidate responses.

The responses determined by the core processing module 220 may be provided to a response queue or response cache 234. For example, the response cache 234 may ensure that a sequence of responses can be displayed in a pre-defined time stream. Assuming that, for a message, there are no less than two responses determined by the core processing module 220, then a time-delay setting for the responses may be necessary. For example, if a message inputted by the player is "Did you eat your breakfast?", two responses may be determined, such as, a first response "Yes, I ate bread" and a second response "How about you? Still feeling hungry?". In this case, through the response cache 234, the chatbot may ensure that the first response is provided to the player immediately. Further, the chatbot may ensure that the second response is provided in a time delay, such as 1 or 2 seconds, so that the second response will be provided to the player 1 or 2 seconds after the first response. As such, the response cache 234 may manage the to-be-sent responses and appropriate timing for each response.

The responses in the response queue or response cache 234 may be further transferred to the user interface 210 such that the responses can be displayed to the user in the chat window.

It should be appreciated that all the elements shown in the chatbot system 200 in FIG. 2 are exemplary, and depending on specific application requirements, any shown elements may be omitted and any other elements may be involved in the chatbot system 200.

Figure 3:
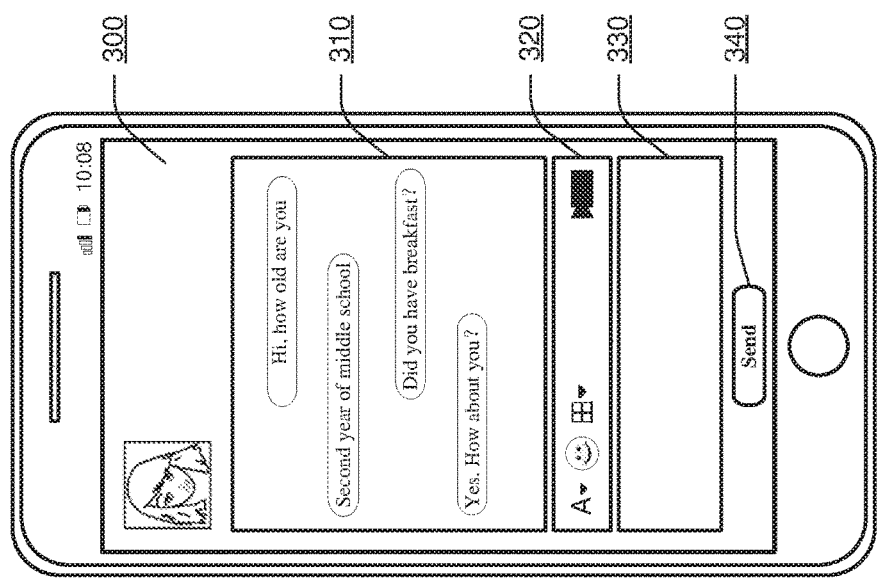
FIG. 3 illustrates an exemplary chat window according to an embodiment.

FIG. 3 illustrates an exemplary chat window 300 according to an embodiment. The chat window 300 may comprise a presentation area 310, a control area 320 and an input area 330. The presentation area 310 displays messages and responses in a chat flow. The control area 320 includes a plurality of virtual buttons for the user to perform message input settings. For example, the user may select to make a voice input, attach image files, select emoji symbols, make a short-cut of the current screen, etc. through the control area 320. The input area 330 is used for the user to input messages. For example, the user may type text through the input area 330. The chat window 300 may further comprise a virtual button 340 for confirming to send inputted messages. If the user touches the virtual button 340, the messages inputted in the input area 330 may be sent to the presentation area 310.

It should be noted that all the elements and their layout shown in FIG. 3 are exemplary. Depending on specific application requirements, the chat window in FIG. 3 may omit or add any elements, and the layout of the elements in the chat window in FIG. 3 may also be changed in various manners.

Figure 4:
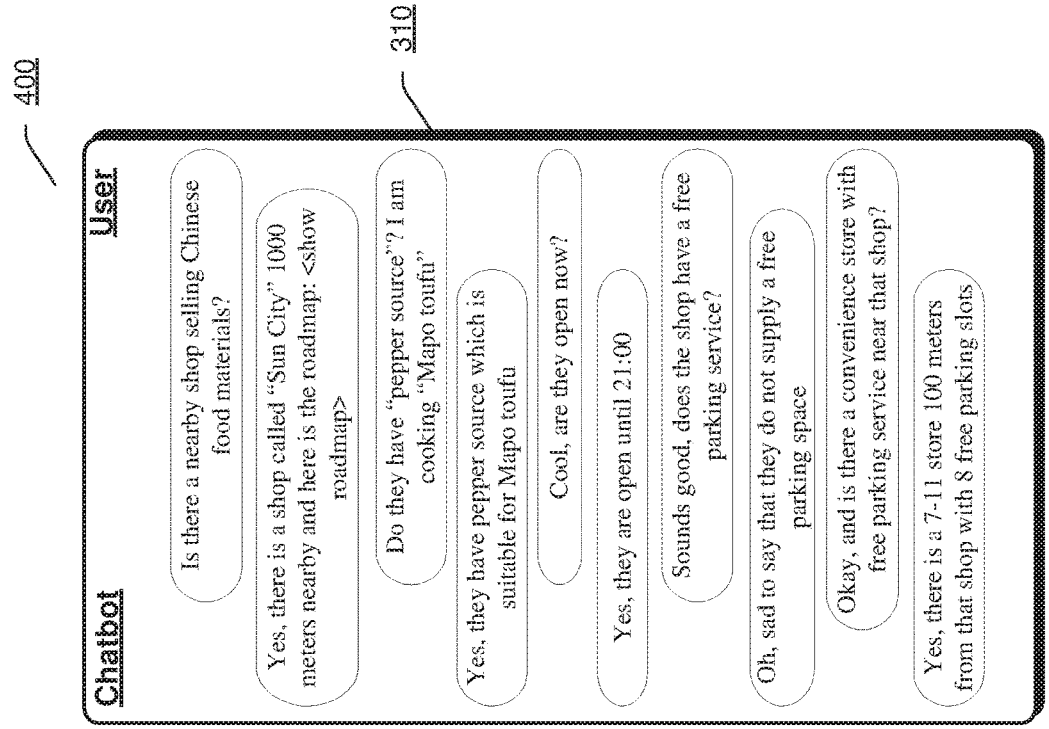
FIG. 4 illustrates an exemplary chat flow according to an embodiment.

FIG. 4 illustrates an exemplary chat flow 400 according to an embodiment. Only the presentation area 310 of the UI is illustrated in FIG. 4. In the exemplary chat flow 400, the chatbot supplies local service information in response to the user's messages or queries.

For example, when the user input a message "Is there a nearby shop selling Chinese food materials?", a location information "nearby" may be identified and the physical location may be obtained by means of a measuring tool such as a Global Position System (GPS) equipped on the computing device 120. Moreover, an expenditure intention related to buying Chinese food material is identified. The expenditure intention may also be referred to as service intention. A response such as "Yes, there is a shop called "Sun City" 1000 meters nearby and here is the roadmap" may be generated and provided in the chat flow based on the identified location information and/or the service intention information as well as the local service index set 254 and the knowledge data set 256.

For example, when the user input a message "Cool, are they open now?", a time information "now" may be identified and the physical time may be obtained by the time of sending the message on the computing device 120. A response such as "Yes, they are open until 21:00" may be generated and provided in the chat flow based on the identified time information as well as the local service index set 254 and the knowledge data set 256.

For example, when the user input a message "Sounds good, does the shop have a free parking service?", a service intention related to finding a free parking is identified. A response such as "Oh, sad to say that they do not supply a free parking space" may be generated and provided in the chat flow based on the service intention information as well as the local service index set 254 and the knowledge data set 256.

For example, when the user input a message "Okay, and is there a convenience store with free parking service near that shop?", a location information "near that shop" may be identified, and a service intention related to finding a free parking is identified. A response such as "Yes, there is a 7-11 store 100 meters from that shop with 8 free parking slots" may be generated and provided in the chat flow based on the location information and/or the service intention information as well as the local service index set 254 and the knowledge data set 256.

It should be appreciated that the illustrated chat flow is just for illustration of the disclosed technique, but not suggests any limitation to the disclosure. Similar chat flows may occurs for providing service information of various topics such as restaurants, hotels, shops, gymnasiums, gardens, scenery spot, traffic facilities and so on.

Figure 5:
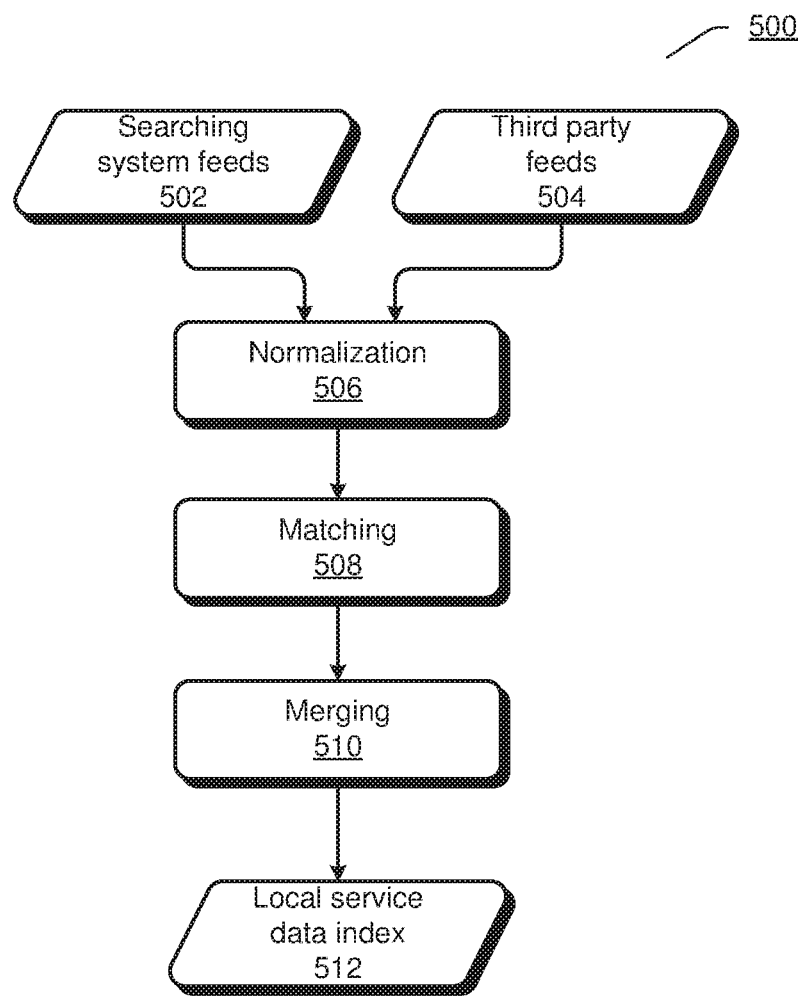
FIG. 5 illustrates an exemplary process for constructing local service data index according to an embodiment.

FIG. 5 illustrates an exemplary process for constructing local service data index set according to an embodiment.

Various data feeds may be used to construct the local service data index set. Examples of the data feeds include the searching system feeds 502 and third party feeds 504.

Data feeds from different sources may be of different formats. At 506, normalization may be performed to the data of different formats. In some implementations, entities of different formats may be transformed to a common schema, which is defined as a unified data format for an entity. An exemplary schema of one normalized entity is shown below:
1. Name=value
2. Address=<address line, city, subdivision>
3. Telephone number(s)=value
4. Longitude and latitude of the address=value
5. Opening time=value
6. Number of spaces for parking=value
7. Website=URL As illustrated, the schema includes attributes such as name, address, telephone number, coordinated of the address, opening time, the number of spaces for parking, website and so on as well as values for the attributes. It should be appreciated that the schema of the entity is not limited to the illustrated format, and there may be more or less attributes in the schema.

The normalization at 506 may include normalization of attribute values. For example, for Asian languages such as Japanese, taking a restaurant name "すき家" (Sukiya, a chain restaurant name) as an example, a normalized name such as "すきや" (Sukiya) which is a hirakana normalization of the "すき家" may be provided in the normalized entity.

The normalization at 506 may include geocoding of addresses, such as the longitude and latitude attribute, which may provide precise location information for an entity.

At 508, similar feed entities may be grouped into one cluster. Making use of the attributes/values in the entities, a decision tree ranker may be trained to score the similarity of two entities to determine whether or not they should be grouped into one cluster. For example, a gradient boosting decision tree (GBDT) may be trained to compute the similarity of two entities. Exemplary features of the GBDT ranker may include at least a part of the following: Is same name? Is same address line? Is same city? Is same subdivision? Is same address? Is same phone number? Is one entity's name the substring of another entity's name? Is one entity's city the substring of another entity's city? Is normalized name the substring of another? The edit distance between two names; The edit distance between two normalized names; Is same website? Is website the prefix of another?

After grouping similar entities into clusters, entities in one cluster may be merged into one entity by selecting final attribute values and/or applying corrections for the merged entity at 510. Entities resulted after the merging process may be used to construct the local service data index set 512.

Figure 6:
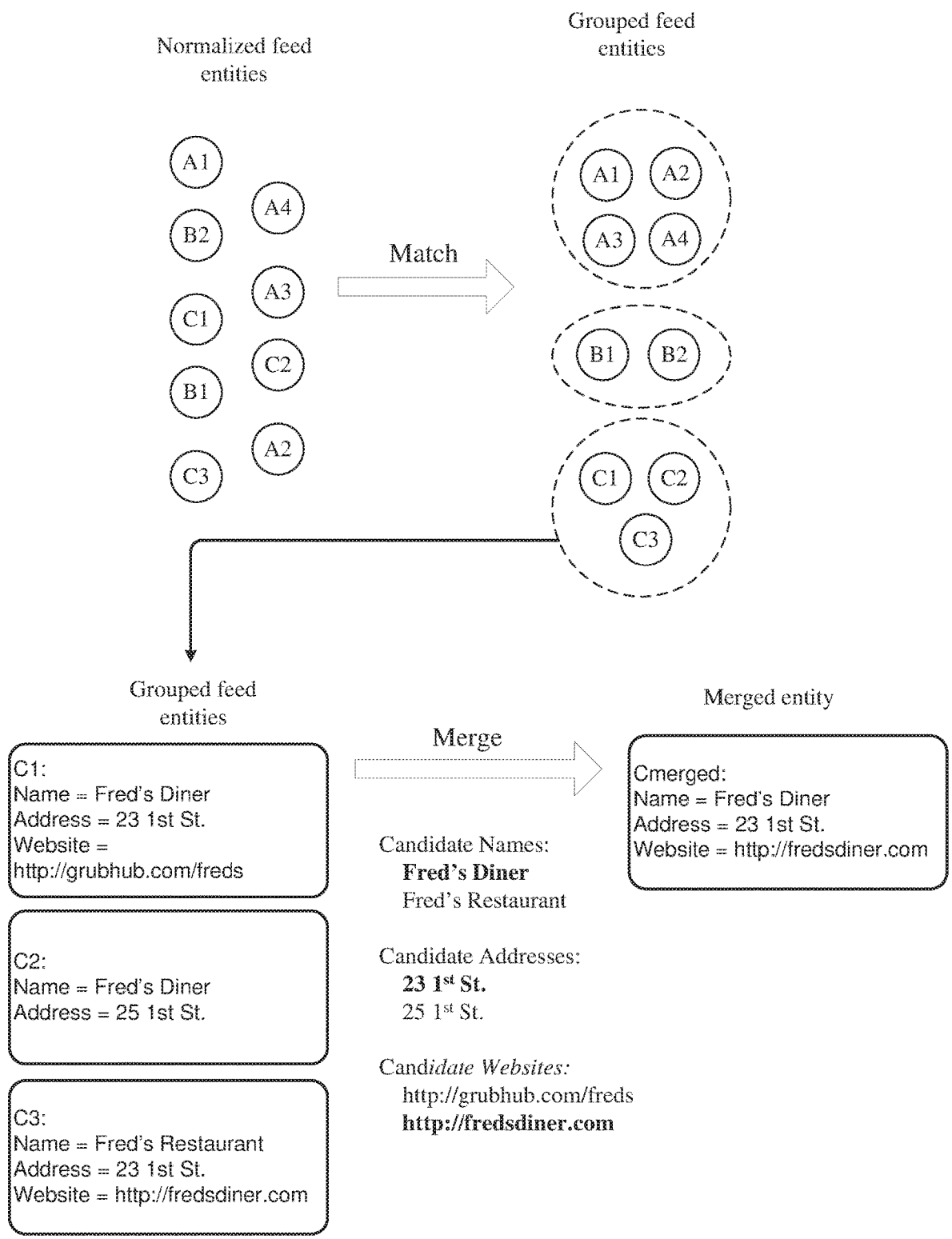
FIG. 6 illustrates an exemplary process for some operations of FIG. 5 according to an embodiment.

FIG. 6 illustrates an exemplary process for the matching and merging process according to an embodiment.

As illustrated, the normalized feed entities such as A1 to C3 may be grouped into multiple clusters through the matching process. Taking the cluster including entities C1 to C3 as an example, the final attribute values, e.g., Name=Fred's Diner, Address=23 1st St, Website=http://fredsdiner.com, are determined from the attribute values provided in the entities C1 to C3, so as to form the merged entity.

It should be appreciated that this example only shows three attributes in one entity for sake of illustration, there may be more attributes in one entity.

Figure 7:
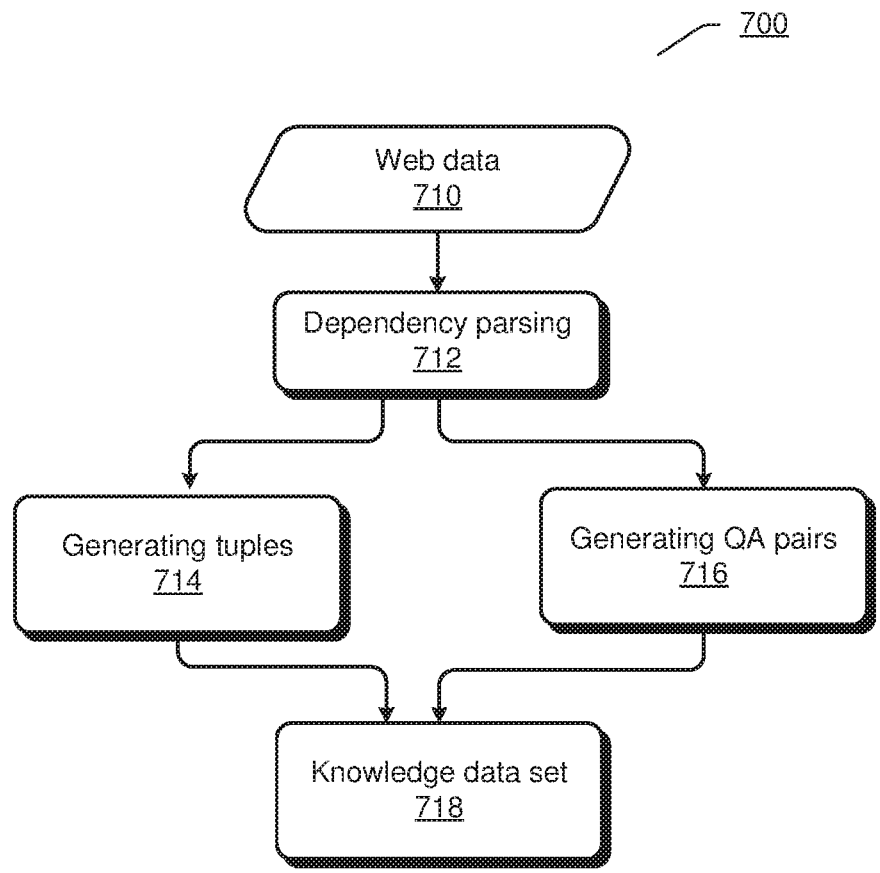
FIG. 7 illustrates an exemplary process for constructing local service knowledge data set according to an embodiment.

FIG. 7 illustrates an exemplary process for constructing knowledge data set according to an embodiment.

At 710, web data may be crawled from the network. For example, the web data may be knowledge information from local service related websites or knowledge-style websites on the network. Examples of local service related websites includes various service commenting websites such as Yelp.com, Dianping.com and so on, various tourism websites such as tripadvisor.com, ctrip.com and so on, various service provider's websites, and so on. In some implementations, the feed data of the local service index set may also be used at 710.

Figure 8:
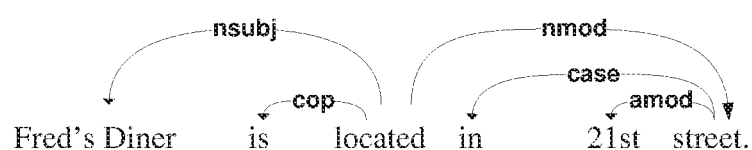
FIG. 8 illustrates examples of dependency parsing according to an embodiment.

At 712, dependency parsing may be applied on the web data. Any existing dependency parser may be adopted for performing dependency parsing, e.g., predicate-argument structure analysis. Through dependency parsing, dependency arcs and dependency roles among words/phrases of a sentence may be obtained. FIG. 8 illustrates an exemplary dependency parsing on an exemplary sentence according to an embodiment. Assuming that a sentence "Fred's Diner is located in 21st street." is inputted to the dependency parsing.

The word "located" is determined as a predicate of the sentence. A dependency arc from "located" to "Fred's Diner" is determined, and the dependency role between "Fred's Diner" and "located" is determined as "nsubj", where "nsubj" denotes nominal subject. A dependency arc from "located" to "is" is determined, and the dependency role between "is" and "located" is determined as "cop", where "cop" denotes copula. A dependency arc from "located" to "street" is determined, and the dependency role between "street" and "located" is determined as "nmod", where "nmod" denotes nominal modifier. A dependency arc from "street" to "21st" is determined, and the dependency role between "21st" and "street" is determined as "amod", where "amod" denotes adjectival modifier. A dependency arc from "street" to "in" is determined, and the dependency role between "in" and "street" is determined as "case", where "case" denotes case markers such as prepositions, postpositions. It should be appreciated that the dependency roles shown in FIG. 8 are exemplary, and for other sentences, various dependency roles may be determined through the dependency parsing.

Predicates and arguments may be identified based on the dependency parsing as shown in FIG. 8, and may be used to generate tuples as knowledge data at 714. For example, knowledge graph in the form of triple tuple <entity, attribute, value> may be generated from the sentence shown in FIG. 8, that is, <Fred's Diner, address, 21st street>. For another sentence "The Chinese restaurant opens from 9:00 am to 23:00 pm.", a knowledge data <Fred's Diner, open time, 9:00 to 23:00> may be generated.

At 716, question-answer pairs may be generated as the knowledge data based on the dependency parsing as shown in FIG. 8. For example, for the predicates and arguments involved in the dependency trees as shown in FIG. 8, a question-answer pair may be generated from the dependency tree, where the answer may be a predicate or an argument which is related to sensitive information, example of the sensitive information may include time, location, parking, discounting, specialty, user comments, and so on. And the question may be the sentence that replaces the selected predicate or argument with a special question word. The question and the answer may be adapted in some suitable form. For example, the answer may be "21st street" or "it's located at 21st street" and the question may be "where is Fred's Diner located" for the sentence shown in FIG. 8. For another sentence "Fred's Diner opens from 9:00 am to 23:00 pm.", a knowledge data <question=when does Fred's Diner open, answer=it opens from 9:00 am to 23:00 pm>may be generated. In addition to the location information and time information, the knowledge data pairs may include other information such as the service intention classification information. For example, for a sentence "Fred's Diner provides French cuisine", a knowledge data <what kind of cuisine does Fred's Dinner provide, French cuisine> may be generated, which includes service intention classification information.

By using question-answer pairs as knowledge data, user's question may be matched with the question-answer pairs and the pair with the maximum similarity score may be selected to provide the answer. In this way, the knowledge data may facilitate the deep question and answer process between the user and chatbot.

At 718, a knowledge data set may be established by using the tuples and/or the question-answer pairs collected from large scale web data. The knowledge data set may include knowledge data that can contribute to improve semantic diversity and accordingly improve the local service recommendation.

Figure 9:
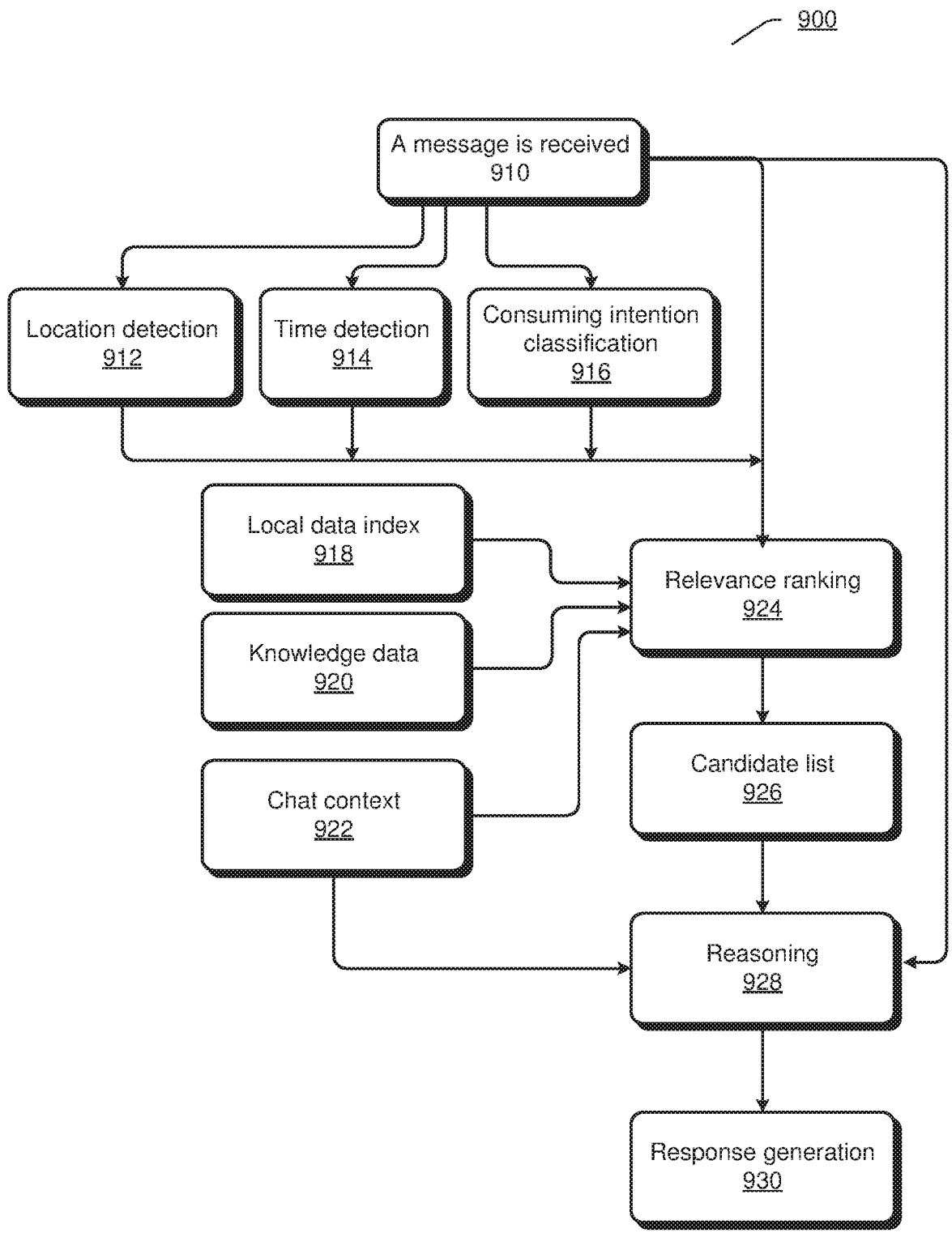
FIG. 9 illustrates an exemplary process for generating a response according to an embodiment.

FIG. 9 illustrates an exemplary process 900 for providing local service information in automated chatting according to an embodiment.

A message is received by the chatbot from a user at 910. Location information, time information and/or service intention information may be detected from the message at 912, 914 and/or 916. In some implementations, the message may be attached with information such as the ID of the user who sent the message, the time that the user input the message and the location of the user yielded by measuring tool such as GPS.

The location information in the message may include relative location and determined location. Examples of the relative location information include "nearby" in "Is there a nearby shop" as illustrated in FIG. 4. In this case, the GPS location information may be used to determine the location. Examples of the determined location information may be "shinagawa station" in a message "find a cloth shop in Shinagawa station".

Examples of the time information include "now" in "are they open now" as illustrated in FIG. 4. In this case, the time that the user input the message or the time the chatbot received the message may be used to determine the time. Examples of the time information include "8:00 pm" in a message "I want to book a restaurant nearby at 8:00 pm".

A service intention classifier may be trained to assign a service intention category or expenditure intention category based on user's message. The category set of the classifier may be a hierarchical tree of numerous categories, examples of the category include restaurant, shop, hotels, gymnasiums, scenery spot, traffic facility and so on. Furthermore, each category may include fine-grained categories, for example, the restaurant category may further include fine-grained categories such as Chinese restaurant, Japanese Cuisine, Indian cuisine, and so on. Also the fine-grained category may include further fine-grained categories, and so on.

A ranker may be used to generate candidate responses at 924. The location information 912, time information 914, service intention classification information 916 as well as the local service data index 918, knowledge data set 920, chat context 922 may be taken as inputs of the ranker. In some implementations, message-title matching may be performed based on the current message 910 and the local data index 918, knowledge 920 to compute the query-title matching scores for candidates provided in the local service data index 918 and knowledge data set 920. The title refers to keywords of an entity such as name, category and/or brief summary of a service entity. In some implementations, a chat context is also used as input of the message-title matching in order to provide context information in the matching process. The chat context may include a plurality of messages, such as query-response pairs, occurred prior to the current message in the chat flow.

The ranker may be implemented as a GBDT. The features of the GBDT may include at least part of the location information, time information, service intention classification information, and latent semantic matching scores. Based on these features, a list of candidate responses with high ranking scores may be identified as shown at 926.

In some implementations, there may be more or less features to be used for the ranker. Although not shown in FIG. 9, user profile information may be used as another feature for the ranker. Examples of the user profile information may include overall users' information or current user's information about an entity. For example, if user comments analysis indicates that a majority of users hold positive, neutral or negative attitude to a service entity or candidate response, the overall user information may be classified as positive, neutral or negative. For example, if current user's profile indicates positive, neutral or negative attitude to a service entity or candidate response, the current user information may be classified as positive, neutral or negative.

The message 910, candidate responses 926 and chat context 922 may be taken as input to perform a reasoning process at 928, and then a final response may be generated at 930. In some implementation, the reasoning process may be implemented by using a Dynamic Memory Network (DMN) model. In some implementations, the candidate response with the highest ranking score may be used as the final response without using the reasoning process.

Figure 10:
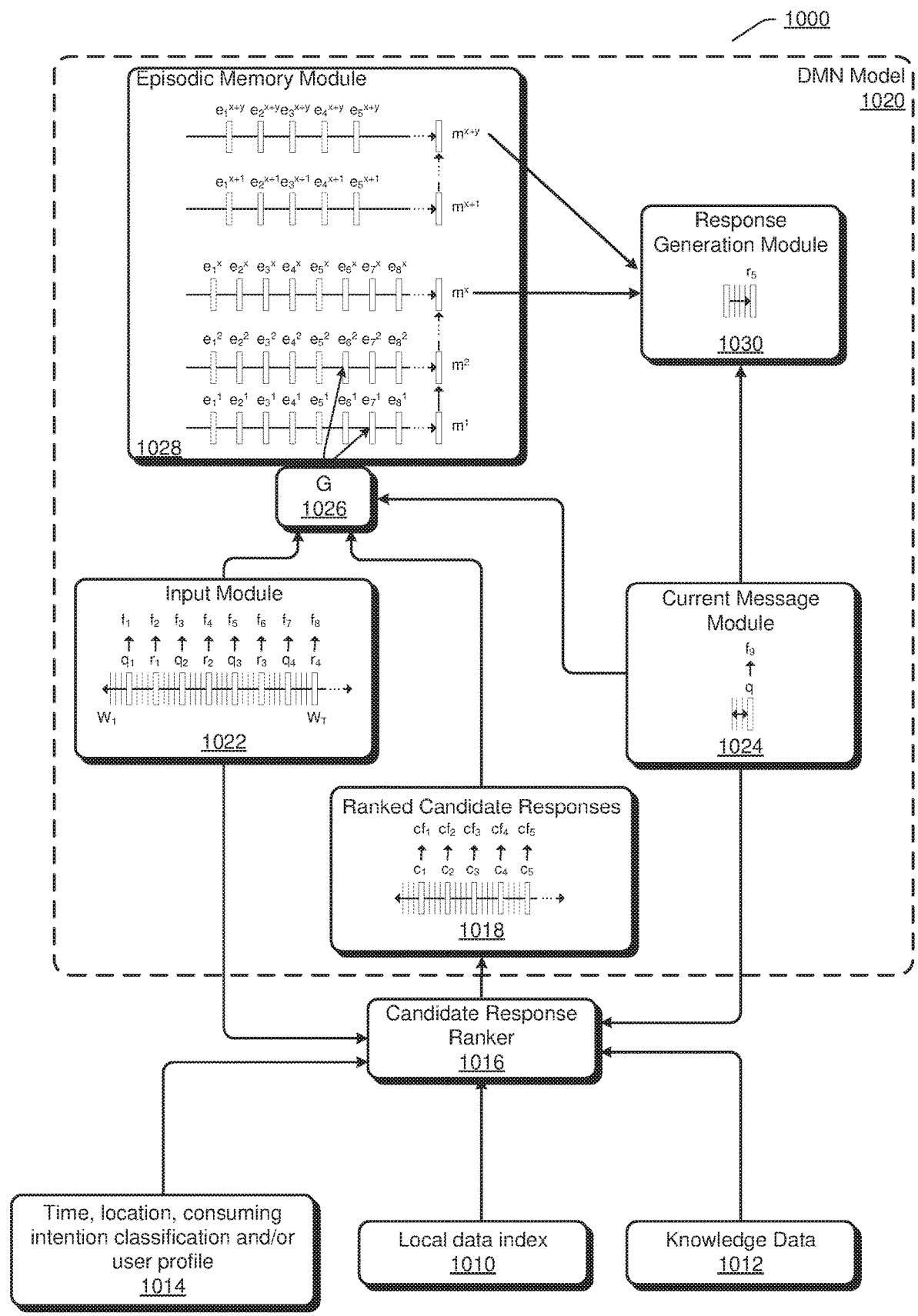
FIG. 10 illustrates an exemplary process of a response providing model according to an embodiment.

FIG. 10 illustrates an exemplary process 1000 of a response providing model according to an embodiment. The response providing model may be based on a combination of a ranking procedure and a generating procedure. Through the ranking procedure, a plurality of candidate responses to a message may be obtained. Through the generating procedure, a response to the message may be generated, where the response is generated based at least on the ranked candidate responses.

The candidate response ranker 1016 may identify candidate responses from the local service data index 1010 and/or the knowledge data set 1012 based on the time, location, service intention classification and/or user profile information 1014 and message-title matching scores, where the matching scores may be obtained through latent semantic matching neural network based on the current message 1024 and optionally the chat context 1022 as well as the local service data index 1010 and/or the knowledge data set 1012. For example, assuming that the current message is "Is there a nearby shop selling Chinese food materials?" as shown in FIG. 4, the location information may be the GPS yielded location, the time information may be the current time although there is no explicit time information in the message, the service intention classification information may be shop→Chinese food, the user profile information may be the overall user interest or current user interest to a service entity. These features may act together with the latent semantic matching scores of the candidates provided in the local data index set and the knowledge data set to identify candidate responses to the message. For example, a plurality of preliminary candidate responses may be found from the local service data index 1010 and/or the knowledge data set 1012 based on the latent semantic matching scores, and then the final candidate responses may be identified by further ranking based on the location, time, serve intention, user profile and the matching scores.

The message-title matching scores may be obtained through a latent semantic matching model. One or more features may be adopted in the latent semantic matching model.

In an implementation, a feature in the matching model may be based on a language model for information retrieval. This feature may evaluate the relevance between a message q and a candidate response R through:

$$P(q|R)=\Pi_{w \in q}[(1-\lambda)P_{ml}(w|R)+\lambda P_{ml}(w|C)] \quad \text{Equation (1)}$$

where $P_{ml}(w|R)$ is the maximum likelihood of word w estimated from R, and $P_{ml}(w|C)$ is a smoothing item that is computed as the maximum likelihood estimation in a large-scale corpus C. The smoothing item avoids zero probability, which stems from those words appearing in the candidate R but not in the message q. The λ is a parameter that acts as a trade-off between the likelihood and the smoothing item, where λ∈(0, 1). This feature works well when there are a number of words overlapped between the message and the candidate response.

In an implementation, a feature in the matching model may be based on a translation-based language model. This feature may learn word-to-word and/or phrase-to-phrase translation probability from, such as, question-answer pairs, and may incorporate the learned information into the maximum likelihood. Given a message q and a candidate response R, the translation-based language model may be defined as:

$$P_{tr-b}(q|R)=\Pi_{w \in q}[(1-\lambda)P_{mx}(w|R)+\lambda P_{ml}(w|C)] \quad \text{Equation (2)}$$

$$P_{mx}(w|R)=\alpha P_{ml}(w|R)+\beta P_{tr}(w|R) \quad \text{Equation (3)}$$

$$P_{tr}(w|R)=\Sigma_{v \in R}P_{tp}(w|v)P_{ml}(v|R) \quad \text{Equation (4)}$$

Here λ, α and β are parameters satisfying λ∈(0, 1) and α+β=1. $P_{tp}$ (w|v) is a translation probability from word v in R to word w in q.

In an implementation, a feature in the matching model may be an edit distance between a message and a candidate question in a word or character level. Herein, the candidate question may refer to a question in a question-answer pair which includes an answer determined as a candidate response to the message.

In an implementation, a feature in the matching model may be a maximum subsequence ratio between a message and a candidate question.

In an implementation, a feature in the matching model may be emotion label similarity between a message and a candidate question, or between a message and a candidate response.

In an implementation, a feature in the matching model may be based on a latent semantic similarity model. The latent semantic similarity model takes one or more types of basic semantic units as inputs, e.g., words, n-gram phrases, chunks, dependency arcs, etc. in a message and a candidate response. The latent semantic similarity model may adopt Recurrent Neural Network (RNN) to perform sentence encoding. Various techniques may be used for the RNN sentence encoding, such as, Long-Short Term Memory (LSTM), Gated-recurrent Unit (GRU), etc. Through the latent semantic similarity model, the similarity between the message and the candidate response may be computed in a vector space or latent semantic space.

In an implementation, a feature in the matching model may be based on a chat context of a chat flow. The chat context may include messages from the user and responses from the chatbot. The matching model may extract representative words from the chat context through, such as, TF-IDF (term frequency-inverse document frequency). Those candidate responses including more representative words or including representative words with a higher occurrence frequency may be given a higher matching score.

In an implementation, a feature in the matching model may be based on the knowledge data. Those candidate responses determined from knowledge question-answer pairs in the knowledge data, or including attributes/values in knowledge items in the knowledge data may be given a higher score. The local service data index may be updated less frequently as it is constructed from feed data, while the knowledge data may include miscellaneous knowledge as it is obtained from large scale web data which may update more frequently, therefore the knowledge data set provides an important supplement to the local service data index. The semantic diversity may be enhanced if candidate responses are generated with the knowledge data set, and accordingly a better response may be expected to generate in the model.

It should be appreciated that although it is described in the way that at least part of the above features may be used to compute the query-title matching score in a latent semantic matching model, the above features as well as their resulting scores may also be directly used in the GBDT model together with the location, time, service intention classification, and/or user profile features to compute the final ranking scores of the candidate responses.

One or more top-ranked candidate responses 1018 may be outputted by the candidate response ranker 1016. The response providing model in FIG. 10 may comprise a DMN model 1020 for generating a response to the current message based on the ranked candidate responses 1018.

The DMN model 1020 may comprise an input module 1022. A sequence of sentences may be processed in the DMN module 1020. The sequence of sentences may be messages and responses in the chat context. As an example, FIG. 10 shows four messages $q_1$, $q_2$, $q_3$, $q_4$ and four corresponding responses $r_1$, $r_2$, $r_3$, $r_4$ being processed in the input module 1022. All the eight sentences may be concatenated together to form a word sequence having T words, from $W_1$ to $W_T$. A bidirectional GRU encoding may be applied on the word sequence. For the left-to-right direction or the right-to-left direction, at each time step t, the DMN model 1020 may update its hidden state as $h_t=GRU(L[w_t], h_{t-1})$, where L is an embedding matrix, and $w_t$ is a word index of the t-th word in the word sequence. Thus, a resulting representation vector for a sentence is a combination of two vectors and each vector is from one direction. Internal mechanism of the GRU may be defined by the following equations:

$$z_t = \sigma(W^{(z)}x_t + U^{(z)}h_{t-1} + b^{(z)})$$ Equation (5)

$$r_t = \sigma(W^{(r)}x_t + U^{(r)}h_{t-1} + b^{(r)})$$ Equation (6)

$$\tilde{h}_t = \tan h(Wx_t + r_t \circ Uh_{t-1} + b^{(h)})$$ Equation (7)

$$h_t = z_t \circ h_{t-1} + (1-z_t) \circ \tilde{h}_t$$ Equation (8)

where $\circ$ is an element-wise product, $W^{(z)}$, $W^{(r)}$, W, $U^{(z)}$, U are weight matrixes obtained by training, $W^{(z)}$, $W^{(r)}$, W $\in R^{n_H \times n_I}$, and $U^{(z)}$, $U^{(r)}$, $U \in R^{n_H \times n_H}$. Here, $n_H$ denotes a dimension of hidden layer, and $n_I$ denotes a dimension of input layer. The above equations may also be abbreviated as $h_t = GRU(x_t, h_{t-1})$.

In addition to encoding the word sequence, a positional encoding with bidirectional GRU may also be applied so as to represent latent semantic "facts" of the sentences. The facts may be computed as $f_t = GRU_{l2r}(L[S_t], f_{t-1}) + GRU_{r2l}(L[S_t], f_{t-1})$, t where l2r denotes left-to-right, r2l denotes right-to-left, $S_t$ is an embedding expression of a current sentence, and $f_{t-1}$ and $f_t$ are facts of a former sentence and the current sentence respectively. As shown in FIG. 10, facts $f_1$ to $f_8$ are obtained for the eight sentences.

The DMN model 1020 may comprise a current message module 1024. The encoding for the current message is a simplified version of the input module 1022, where there is only one sentence to be processed in the current message module 1024. The processing by the current message module 1024 is similar with the input module 1022. Assuming that there are $T_Q$ words in the current message, hidden states at the time step t may be computed as $q_t = [GRU_{l2r}(L[W_t^Q], q_{t-1}), GRU_{r2l}(L[W_t^Q], q_{t-1})]$, where L is an embedding matrix, and $W_t^Q$ is a word index of the t-th word in the current message. Moreover, a fact $f_9$ may be obtained for the current message in the current message module 1024.

The DMN model 1020 may comprise a ranked candidate responses module 1018. The DMN model 1020 may compute hidden stats and facts for the ranked candidate responses in the same way as the input module 1022. As an example, FIG. 10 shows five candidate responses to $C_1$ to $C_5$, and five facts $cf_1$ to $cf_5$ are obtained for these candidate responses.

The DMN model 1020 may comprise an episodic memory module 1028 and an attention mechanism module 1026. The episodic memory module 1028 may include a recurrent network, and the attention mechanism module 1026 may be based on a gating function. The attention mechanism module 1026 may be separated from or incorporated in the episodic memory module 1028.

The episodic memory module 1028 and the attention mechanism module 1026 may cooperate to update episodic memory in an iteration way. For each pass i, the gating function of the attention mechanism module 1026 may take a fact $f^i$, a previous memory vector $m^{i-1}$, and a current message q as inputs, to compute an attention gate $g_t^i = G[f^i, m^{i-1}, q]$. To compute the episode memory vector $e^i$ for pass i, a GRU over a sequence of inputs, e.g., a list of facts $f^i$, weighted by the gates $g^i$ may be applied. Then the episodic memory vector may be computed as $m^i = GRU(e^i \mu m^{i-1})$. Initially, $m^0$ is equal to a vector expression of the current message q. The episode memory vector that is given to a response generation module may be the final state $m^x$ of the GRU. The following Equation (9) is for updating hidden states of the GRU at a time step t, and the following Equation (10) is for computing the episode memory vector.

$$h_t^i = g_t^i GRU(f_t, h_{t-1}^i) + (1-g_t^i)h_{t-1}^i$$ Equation (9)

$$e^i = h_{T_C}^i$$ Equation (10)

where $T_C$ is the number of input sentences.

According to the embodiment of the present disclosure, the processing in the episodic memory module 1028 and the attention mechanism module 1026 in the DMN model 1020 further takes the ranked candidate responses into account. As shown in FIG. 10, besides the input module 1022 and the current message module 1024, the attention mechanism module 1026 also obtains input from the ranked candidate responses module 1018. The attention gate for the ranked candidate responses may be computed as $g_t^{x+i} = G[cf^i, m^{x+i-1}, q]$, where $cf^i$ denotes the facts from the ranked candidate responses, and $m_{x+i-1}$ is a memory vector computed for the ranked candidate responses. Accordingly, the recurrent network in the episodic memory module 1028 further comprises a computing process of memories $m^{x+1}$ to $m^{x+y}$ for the ranked candidate responses. In an implementation, the initial state $m^x$ used with the candidate response $cf^1$ (where i=1) to compute $g_t^{x+1}$ is the vector expression of the current message q. In another implementation, the initial state $m^x$ used with the candidate response $cf^1$ (where i=1) to compute $g_t^{x+1}$ is the final state $m^x$ obtained based on the chat context $f^1$ to $f^8$. Outputs from the episodic memory module 1028 to the response generation module 1030 include both $m^x$ and $m^{x+y}$ as shown in 1028.

The response generation module 1030 may be used for generating response. A GRU decoder may be adopted in the response generation module 1030, and an initial state of the GRU decoder may be initialized to be the last memory vector $a_0=[m^x, m^{x+y}]$. In some other implementations, the initial state $a_0$ of the GRU decoder may be initialized to be either one of $m^x$ and $m^{x+y}$. At a time step t, the GRU decoder may take the current message q, a last hidden state $a_{t-1}$, and a previous output $y_{t-1}$ as inputs, and then compute a current output as:

$$y_t = \text{softmax}(W^{(a)} a_t) \qquad \text{Equation (11)}$$

where $a_t = \text{GRU}([y_{t-1}, q], a_{t-1})$, and $W^{(a)}$ is a weight matrix by training.

The output from the response generation module 1030 may be provided to the user as a response to the current message inputted by the user.

It should be appreciated that since the generating procedure in the process 1000 of FIG. 10 takes the ranked candidate responses generated through the ranking procedure and the chat context as inputs, the response outputted by the process 1000 would be able to catch up with the development of the conversation and providing most reasonable information, and accordingly provide effective local service recommendations for the user through the automated chat.

Figure 11:
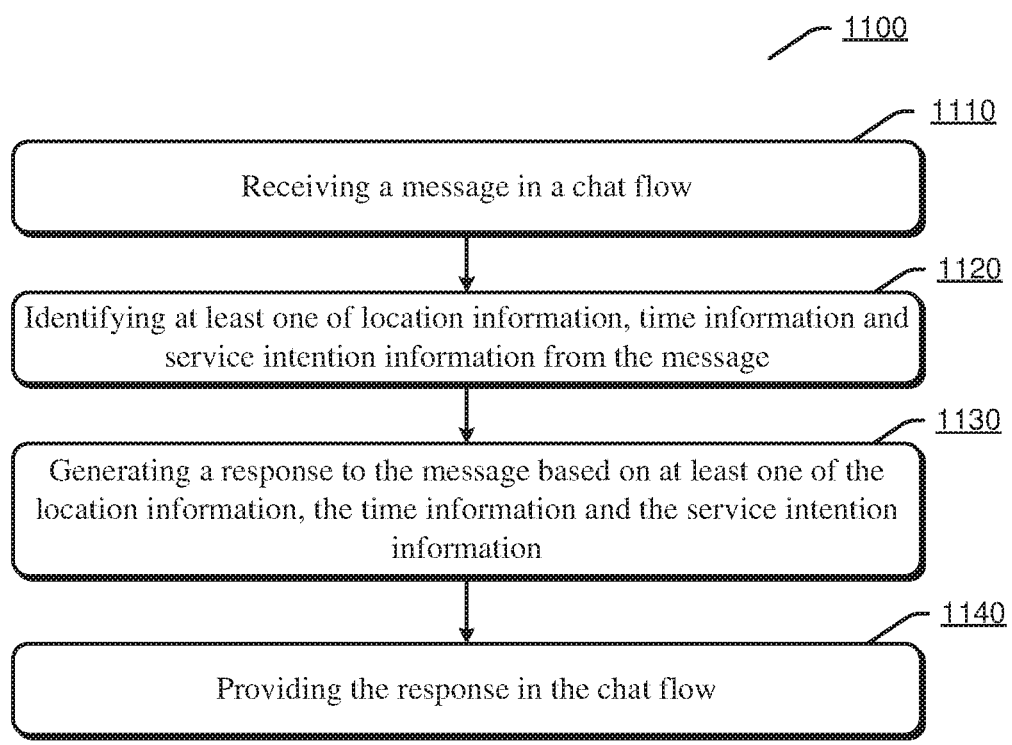
FIG. 11 illustrates a flowchart of an exemplary method for providing local service information in automated chatting according to an embodiment.

FIG. 11 illustrates a flowchart of an exemplary method for providing information in automated chatting according to an embodiment.

At 1110, a message is received by a chatbot from user in a chat flow. At 1120, at least one of location information, time information and service intention information is identified from the message. At 1130, a response to the message is generated based on at least one of the location information, the time information and the service intention information. At 1140, the response is provided in the chat flow.

In an implementation, candidate responses to the message are identified, and the response is generated by reasoning based on one or more of the candidate responses.

In an implementation, the candidate responses are identified based on at least one of the location information, the time information, the expenditure intention information and user profile information.

In an implementation, the candidate responses are identified based on the message and at least one of a local data index set and a knowledge graph. For example, the candidate responses are identified through latent semantic matching of the message and at least one of a local data index set and a knowledge graph.

In an implementation, the candidate responses are identified based on the message, a chat context of the chat flow, and at least one of the local data index set and the knowledge data set. For example, the candidate responses are identified through latent semantic matching of the message based on the chat context and at least one of a local data index set and a knowledge graph.

In an implementation, the knowledge data set is generated from web data. The knowledge data set comprises at least one of location information, time information and service intention information of entities in the form of question-answer pairs and/or in the form of tuples.

In an implementation, the local data index set is generated from feed data. Items of the local data index set include attributes and values, the attributes include at least a part of name, address, coordinates of the address, telephone number, opening time, parking information and website information of local services.

In an implementation, similar items from the feed data are grouped into clusters based on similarity scores of the items, and items in one of the clusters are merged into one item. The merged items are used to generate the local data index.

In an implementation, the reasoning is performed based on the chat context and the one or more candidate responses.

In an implementation, the reasoning is performed through a Dynamic Memory Network (DMN) model.

In an implementation, attention gates are generated based on the chat context of the chat flow and the one or more candidate responses. Episodic memories associated with the chat context and episodic memories associated with the one or more candidate responses are generated based on the attention gates. In this way, the reasoning takes the chat context and the candidate responses into account, so as to keep up with the chatting and provide most reliable information to the user.

In an implementation, attention gates are iteratively generated based on at least one of: latent semantic facts of a chat context of the chat flow and the one or more candidate responses; memory vectors associated with the chat context; memory vectors associated with the one or more candidate responses; and a latent semantic fact corresponding to the message. The memory vectors associated with the chat context and the memory vectors associated with the one or more candidate responses are generated based on the attention gates iteratively.

In an implementation, the response is generated based on one of the episodic memories associated with the chat context and/or one of the episodic memories associated with the one or more ranked candidate responses. For example, the episodic memories are represented by the memory vectors.

Figure 12:
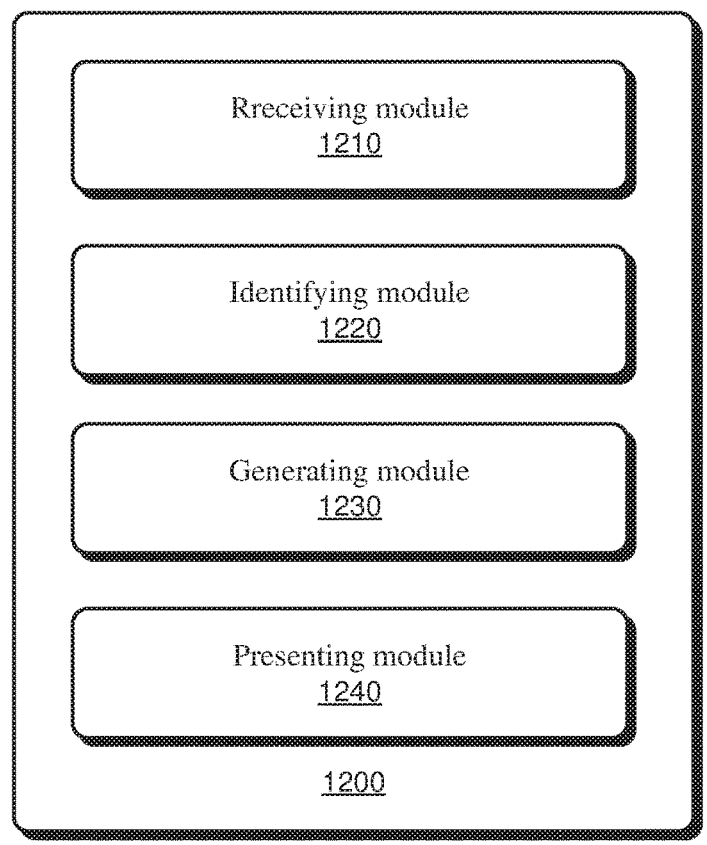
FIG. 12 illustrates an exemplary apparatus for providing local service information in automated chatting according to an embodiment.

FIG. 12 illustrates an exemplary apparatus 1200 for providing information in automated chatting according to an embodiment.

The apparatus 1200 may comprise: a receiving module 1210 for receiving a message in a chat flow; an identifying module 1220 for identifying at least one of location information, time information and service intention information from the message; a generating module 1230 for generating a response to the message based on at least one of the location information, the time information and the service intention information; and a presenting module 1240 for presenting the response in the chat flow.

In an implementation, the generating module 1240 identifies candidate responses to the message, and generates the response by reasoning based on one or more of the candidate responses.

In an implementation, the identifying module 1220 identifies the candidate responses based on at least one of the location information, the time information, the expenditure intention information and user profile information.

In an implementation, the identifying module 1220 identifies the candidate responses based on the message and at least one of a local data index set and a knowledge graph.

In an implementation, the identifying module 1220 identifies the candidate responses based on the message and a chat context of the chat flow, and at least one of the local data index set and the knowledge data set.

In an implementation, the apparatus 1200 comprises a knowledge data set generating module for generating the knowledge data set from web data. The knowledge data set comprises at least one of location information, time information and service intention information of entities in the form of question-answer pairs and/or in the form of tuples.

In an implementation, the apparatus 1200 comprises a local data index set generating module for generating the local data index set from feed data. Items of the local data index set include attributes and values, the attributes include at least a part of name, address, coordinates of the address, telephone number, opening time, parking information and website information.

In an implementation, the local data index set generating module groups similar items from the feed data into clusters based on similarity scores of the items, and merges items in one of the clusters into one item.

In an implementation, the generating module 1230 performs the reasoning based on a chat context and the one or more candidate responses.

In an implementation, the generating module 1230 performs the reasoning through a Dynamic Memory Network (DMN) model.

In an implementation, the generating module generates attention gates based on the chat context of the chat flow and the one or more candidate responses, and generates episodic memories associated with the chat context and episodic memories associated with the one or more candidate responses based on the attention gates.

In an implementation, the generating module generates the response based on one of the episodic memories associated with the chat context and/or one of the episodic memories associated with the one or more ranked candidate responses.

It should be appreciated that the apparatus 1200 may comprise any other modules configured for performing any operations according to the embodiments of the present disclosure as described in connection with FIGS. 1-11.

Figure 13:
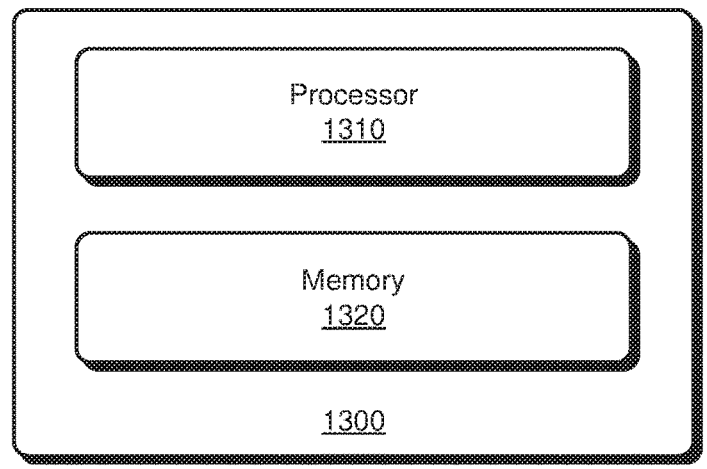
FIG. 13 illustrates an exemplary computing system according to an embodiment.

FIG. 13 illustrates an exemplary computing system 1300 for providing information in automated chatting according to an embodiment.

The computing system 1300 may comprise at least one processor 1310. The computing system 1300 may further comprise a memory 1320 that is connected with the processor 1310. The memory 1320 may store computer-executable instructions that, when executed, cause the processor 1310 to receive a message in a chat flow of an automated chatting; identify at least one of location information, time information and service intention information from the message; generate a response to the message based on at least one of the location information, the time information and the service intention information; and provide the response in the chat flow.

It should be appreciated that the memory 1320 may store computer-executable instructions that, when executed, cause the processor 1310 to perform any operations according to the embodiments of the present disclosure as described in connection with FIGS. 1-12.

The embodiments of the present disclosure may be embodied in a computer-readable medium such as non-transitory computer-readable medium. The non-transitory computer-readable medium may comprise instructions that, when executed, cause one or more processors to perform any operations according to the embodiments of the present disclosure as described in connection with FIGS. 1-12.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for providing information in automated chatting, comprising:
   receiving a message in a chat flow;
   identifying at least one each of location information, time information and service intention information from the message;
   generating a response to the message based on at least one each of the location information, the time information and the service intention information by:
   identifying candidate responses to the message based on at least one each of the location information, the time information, the service intention information and user profile information and based on the message and at least one of a local data index set and a knowledge graph or based on the message;
   generating the knowledge data set from web data, wherein the knowledge data set comprises at least one each of location information, time information corresponding to a time the message was generated by a user or received, and service intention information of entities in the form of question-answer pairs; and generating the local data index set from feed data, wherein items of the local data index set include attributes and values, the attributes include at least a part of name, address, coordinates of the address, telephone number, opening time, parking information and website information;

generating the response by reasoning based on one or more of the candidate responses; and providing the response in the chat flow.

2. The method of claim 1, wherein the identifying candidate responses comprises:

identifying the candidate responses based on the message and at least one of a local data index set and a knowledge graph; or identifying the candidate responses based on the message, a chat context of the chat flow, and at least one of the local data index set and a knowledge data set.

3. The method of claim 1, wherein generating the local data index comprises:

grouping similar items from the feed data into clusters based on similarity scores of the items; and merging items in one of the clusters into one item.

4. The method of claim 1, wherein the reasoning comprises reasoning based on a chat context and the one or more candidate responses.

5. The method of claim 4, wherein the reasoning comprises reasoning through a Dynamic Memory Network (DMN) model.

6. The method of claim 5, wherein the reasoning comprising:

generating attention gates based on the chat context of the chat flow and the one or more candidate responses; and generating episodic memories associated with the chat context and episodic memories associated with the one or more candidate responses based on the attention gates.

7. The method of claim 6, wherein the generating a response comprises:

generating the response based on one of the episodic memories associated with the chat context and/or one of the episodic memories associated with the one or more ranked candidate responses.

8. An apparatus for providing information in automated chatting, comprising:

one or more processors;

a memory storing computer-executable instructions including modules comprising:

a receiving module for receiving a message in a chat flow;

an identifying module for identifying at least one each of location information, time information and service intention information from the message;

a generating module for generating a response to the message based on at least one each of the location information, the time information and the service intention information by:

identifying candidate responses to the message based on at least one each of the location information, the time information, the service intention information and user profile information and based on the message and at least one of a local data index set and a knowledge graph or based on the message;

generating the knowledge data set from web data, wherein the knowledge data set comprises at least one each of location information, time information corresponding to a time the message was generated by a user or received, and service intention information of entities in the form of question-answer pairs; and generating the local data index set from feed data, wherein items of the local data index set include attributes and values, the attributes include at least a part of name, address, coordinates of the address, telephone number, opening time, parking information and website information;

generating the response by reasoning based on one or more of the candidate responses; and a presenting module for presenting the response in the chat flow.

9. The apparatus of claim 8, wherein the identifying module is for:

identifying the candidate responses based on the message and at least one of a local data index set and a knowledge graph; or identifying the candidate responses based on the message and a chat context of the chat flow, and at least one of the local data index set and the knowledge data set.

10. The apparatus of claim 8, wherein the local data index set generating module is for:

grouping similar items from the feed data into clusters based on similarity scores of the items; and merging items in one of the clusters into one item.

11. The apparatus of claim 8, wherein the generating module performs the reasoning based on a chat context and the one or more candidate responses.

12. The apparatus of claim 11, wherein the generating module performs the reasoning through a Dynamic Memory Network (DUN) model.

13. The apparatus of claim 12, wherein the generating module is for:

generating attention gates based on the chat context of the chat flow and the one or more candidate responses; and generating episodic memories associated with the chat context and episodic memories associated with the one or more candidate responses based on the attention gates.

14. The apparatus of claim 13, wherein the generating module is for:

generating the response based on one of the episodic memories associated with the chat context and one of the episodic memories associated with the one or more ranked candidate responses.

15. A computer system, comprising:

one or more processors; and a memory storing computer-executable instructions that, when executed, cause the one or more processors to:

receive a message in a chat flow of an automated chatting;

identify at least one each of location information, time information and service intention information from the message by:

identifying candidate responses to the message based on at least one each of the location information, the time information, the service intention information and user profile information and based on the message and at least one of a local data index set and a knowledge graph or based on the message;

generating the knowledge data set from web data, wherein the knowledge data set comprises at least one each of location information, time information corresponding to a time the message was generated by a user or received, and service intention information of entities in the form of question-answer pairs; and generating the local data index set from feed data, wherein items of the local data index set include attributes and values, the attributes include at least a part of name, address, coordinates of the address, telephone number, opening time, parking information and website information;

generating the response by reasoning based on one or more of the candidate responses;

generate a response to the message based on at least one each of the location information, the time information and the service intention information; and provide the response in the chat flow.

\* \* \* \* \*